United States Patent
Sloupenský et al.

(10) Patent No.: US 6,573,628 B1
(45) Date of Patent: Jun. 3, 2003

(54) APPARATUS FOR SPINNING-IN YARN IN A SPINNING MACHINE

(75) Inventors: Jiří Sloupenský, Orlici (CZ); Josef Ludvícek, Orlici (CZ); Miloš Mládek, Orlici (CZ)

(73) Assignee: Rieter Elitex A.S. (CZ)

( * ) Notice: Subject to any disclaimer, the term of this patent is extended or adjusted under 35 U.S.C. 154(b) by 0 days.

(21) Appl. No.: 09/486,731

(22) PCT Filed: Aug. 31, 1998

(86) PCT No.: PCT/CZ98/00034

§ 371 (c)(1),
(2), (4) Date: Mar. 1, 2000

(87) PCT Pub. No.: WO99/11848

PCT Pub. Date: Mar. 11, 1998

(30) Foreign Application Priority Data

Sep. 2, 1997 (CZ) .......................................... 33 2739-97

(51) Int. Cl.[7] .............................. H02K 1/27; H02K 7/09; D01H 4/10; D01H 4/14
(52) U.S. Cl. ............................ 310/90.5; 57/301; 57/406
(58) Field of Search ........................... 310/90.5; 57/301, 57/406

(56) References Cited

U.S. PATENT DOCUMENTS

| | | | | | |
|---|---|---|---|---|---|
| 4,076,340 A | * | 2/1978 | Meinke et al. | ............. | 310/90.5 |
| 4,167,296 A | | 9/1979 | Dendy | ............. | 31/90.5 |
| 4,242,860 A | * | 1/1981 | Wehde et al. | ............. | 57/81 |
| 4,249,369 A | * | 2/1981 | Tsuzuki et al. | ............. | 57/263 |
| 4,384,451 A | * | 5/1983 | Elias et al. | ............. | 57/263 |
| 5,414,990 A | * | 5/1995 | Blazek et al. | ............. | 57/411 |
| 5,535,582 A | * | 7/1996 | Paweletz | ............. | 57/414 |
| 5,537,810 A | * | 7/1996 | Paweletz | ............. | 57/406 |
| 5,570,572 A | * | 11/1996 | Birkenmaier et al. | ............. | 57/406 |
| 5,637,941 A | * | 6/1997 | Paweletz | ............. | 310/90.5 |
| 5,640,838 A | * | 6/1997 | Billner et al. | ............. | 57/263 |
| 5,646,465 A | * | 7/1997 | Paweletz | ............. | 310/90.5 |
| 6,057,681 A | * | 5/2000 | Kipp et al. | ............. | 324/207.2 |
| 6,124,658 A | * | 9/2000 | Coenen | ............. | 310/90.5 |

FOREIGN PATENT DOCUMENTS

| | | | | |
|---|---|---|---|---|
| DE | 3729425 | | 9/1988 | |
| DE | 4103369 | | 9/1991 | |
| DE | 4421406 | | 12/1995 | |
| DE | 101 63 979 | * | 7/2002 | ............. D01H/4/10 |
| FR | 2277915 | | 2/1976 | |

* cited by examiner

Primary Examiner—Karl Tamai
(74) Attorney, Agent, or Firm—Ostrolenk, Faber, Gerb & Soffen, LLP

(57) ABSTRACT

A spinning device of a rotor spinning machine has a spinning rotor made of magnetically hard material, seated for rotation in an air chamber connected with an underpressure source. A stator includes at least two electromagnetic coils is arranged around the outer circumferential surface of the spinning rotor. The spinning rotor is made as a ring consisting of magnetically hard material and magnetized normal to the plane passing through the axis of the spinning rotor.

9 Claims, 3 Drawing Sheets

APPARATUS FOR SPINNING-IN YARN IN A SPINNING MACHINE

TECHNICAL FIELD

The invention relates to a spinning device of a rotor spinning machine comprising a spinning rotor made of magnetically conducting material, seated for rotation in an air chamber connected with an underpressure source, and having a stator comprising at least two electromagnetic coils and arranged around the outer circumferential surface of the spinning rotor.

BACKGROUND ART

DOS 24 33 712 discloses a device for mounting and driving a disk-shaped spinning rotor of a rotor spinning machine n which the spinning rotor consists of a circumferential wall and of the bottom of the spinning rotor, the inner side of the circumferential wall being provided with a slide wall and a collecting groove for collecting fibres into a fibre band to be twisted into the yarn during the spinning process. The bottom of the spinning rotor is full and flat, and its lower surface serves as one part of an aerostatic or aerodynamic bearing for taking up axial forces. The spinning rotor is surrounded by an electromagnetic unit comprising electromagnetic coils arranged in the stator common to them and serving chiefly for transmitting radial force. Opposite the bottom of the spinning rotor is arranged an inlet aperture through which in a well-known manner the fibres are fed into the spinning rotor and the spun yarn is led away. The spinning rotor is made of a ferromagnetic material.

The drawback of this solution consists in the difficult cooling of the spinning rotor, in particular when spinning manmade fibres at a speed exceeding 60,000 RPM where high temperature of the collecting surface of the spinning rotor is produced by mechanical losses. Since the spinning rotor makes a compact entity with its drive unit and the heat enters the spinning rotor immediately from the area where it is generated, the cooling of such spinning rotor leaves much to be desired since it is produced merely by the situating of the spinning rotor in the underpressure chamber used to produce underpressure in the spinning rotor.

To do away with the drawbacks of this solution, CZ 214 535, fitted with the spinning rotor of the same design as that of DE 24 33 712, has introduced a heat insulation separating at least the collecting groove area of the spinning rotor from the drive device surrounding the spinning rotor and producing the heat energy. Said heat insulation can consist either of an air gap or of an elastic body.

The spinning rotor revealed in CZ 214 535 is a considerably complicated solution both in design and before all in its actual production process. Its efficacy is subject to doubt, especially in the spinning of man-made fibres involving considerable heat generation due to the friction of said fibres against the inner surfaces of the spinning rotor. No solution is provided for the removal of such heat; on the contrary, its removal is hampered by said insulation layer: For this reason, this solution has never been applied on rotor spinning machines and is only one of the deadlocks in the development of the spinning rotors.

The solution described in DE 24 33 712 has undergone further development in which has been maintained the dish shape of the spinning rotor with the flat bottom situated opposite the inlet aperture. The spinning rotor is situated in an underpressure chamber and contains no air vents. Also maintained has been the seating of the spinning rotor by means of its bottom on an. air cushion even if the embodiment proper of the aerostatic or aerodynamic bearing has undergone modifications in the course of its development. The drive coils have been moved from the area around the circumference of the spinning rotor under the bottom of the spinning rotor, for instance in DE 43 42 583 in which the dish-shaped spinning rotor is made of a non-magnetic material such as aluminium. In the bottom of the spinning rotor are situated drive magnets and guide magnets separated from each other by a non-magnetic substance filling out the space between them. This solution permits a multi-sector pair arrangement of the drive magnets and also a concentric arrangement of the guide magnets.

A drawback common to all the above mentioned solutions consists in the dish-shaped spinning rotor with full bottom situated in the underpressure chamber because the technological air, in the course of the spinning process, enters the spinning rotor with the fibres through the inlet aperture and is at the same time led out through the same inlet aperture. In addition to the fibre feed, said inlet aperture houses also a draw-off trumpet for delivering the spun yarn. Since the increasing rotation speed of the spinning rotors is accompanied by the reduction of their diameters and, consequently, by the reduction of the diameter of the inlet aperture of such high-speed rotors, it is very difficult to position said devices opposite the inlet aperture.

Another drawback consists in the complicatedness, both in design and in production, of the bottom of the spinning rotors which must be fitted with recesses for the drive, and guide magnets and with one part of the aerostatic bearing. The position of the magnets, when inserted in said recesses, must be exact. At the same time must be maintained the static and dynamic balancing of the spinning rotor. Said facts considerably increase the purchase price of the spinning rotor. However, even with increased service life, the spinning rotors are a machine part subject to frequent replacement so that the high purchasing price is a considerable cost item for the user of the spinning machine.

PRINCIPLE OF THE INVENTION

The above drawbacks of the state of art are eliminated or reduced by a spinning device according to the invention whose principle consists in that the spinning rotor is made as a ring magnetized normal to the plane passing through the axis of the spinning rotor.

The chief advantage of this solution consists in the fact that the spinning rotor contains only a minimum quantity of material, and more exactly, only such quantity as is necessary for the creation of the functional surfaces of the spinning rotor, i.e., of the fibre slide surface and of the collecting groove. This reduces considerably the spinning rotor mass and, consequently, the energy amount needed both to start and to brake the spinning rotor.

At the same time it becomes superfluous to have the spinning rotor shaft, and the bearing for seating the spinning rotor which not only further reduces the mass of the rotating system but also saves energy by eliminating the friction losses in the bearing.

As compared with the spinning rotors seated in an aerostatic and/or aerodynamic bearing, the solution according to the present invention, in addition to the above reduction of the mass achieved by the elimination of the spinning rotor bottom, also saves energy otherwise needed for the function of such aerostatic and/or aerodynamic bearing.

In its narrowest sections, the inner side of the spinning rotor defines the inlet aperture and the outlet aperture, of the spinning rotor, and an air chamber is connected to an underpressure source behind the outlet aperture of the spinning rotor.

This arrangement ensures the movement of the technological air through the spinning rotor from the inlet aperture to the outlet aperture, i.e., in the direction identical with that of the singled-out fibres led in a well-known manner into the inlet aperture of the spinning rotor. Such advantage has been up to now known in spinning rotors fitted with air vents in which the underpressure is generated by their proper rotation. Besides, the arrangement according to the invention eliminates the influence of the rotation speed of the spinning rotor on the underpressure in the spinning rotor, which is the chief drawback of the spinning rotors fitted with the air vents and at the same time the chief advantage of the spinning rotors seated in an underpressure air chamber in which the air stream is generated by the connection of the air chamber to an external underpressure source, the drawback of these spinning rotors consisting in that the technological air does not at all pass through the inner space of the spinning rotor.

It results from the above that the spinning device according to the invention, among other things, combines the advantages, and eliminates the drawbacks, of the two well-known spinning rotor designs.

In a preferred embodiment of the spinning device according to the invention, the outlet aperture of the spinning rotor houses a draw-off trumpet which can be preferably introduced through the inlet aperture of the spinning rotor into the inner space of the spinning rotor.

In another embodiment, the draw-off trumpet of the yarn is seated in an air chamber behind the outlet aperture of the spinning rotor. Thus, the draw-off trumpet can be seated in an optimum position in relation to the collecting groove of the spinning rotor according to the material and to the required properties of the yarn to be produced.

The top optimation for various yam sorts can be achieved by mounting the draw-off trumpet adiustably in axial direction. As regards the relation Lo the draw-off Trumpet, the diameter of the outlet aperture of the spinning rotor is preferably superior to the maximum outer diameter of the draw-off trumpet for ensuring the stream of the technological air through the spinning rotor from the inlet aperture to the outlet aperture.

The outer circumferential wall of the spinning rotor is surrounded by a part of the body of the stator of a synchronous electric machine in which the pole extensions of the electromagnetic coils of the stator are seated. The electromagnetic coils can be seated either outside the area around the circumference of the spinning rotor which simplifies the design of the spinning device, or in the area around the circumference of the spinning rotor as is the case in the example of embodiment shown and described later which, in turn. spimplifies the design of the stator.

The electromagnetic coils are preferably connected with a frequency converter of an integrated control system of the spinning device comprising a control circuit with means for interrupting the power supply to a feed clutch with information inputs to which there are connected yarn quality and presence sensors. This provides for the control of the spinning rotor in accordance with the specific conditions existing at the operating unit in question.

In particular for monitoring the spinning rotor position, it is advantageous to place at least three sensors of the magnetic field around the outer circumference of the spinning rotor, preferably in the stator between the pole extensions, and more preferably still, evenly.

The magnetic field sensors are connected to the information inputs of the control circuit of the integrated control system so that their information influences the spinning rotor together with the other items of information at the disposal of the control circuit, thus ensuring optimized run and position of the spinning rotor both during the spinning and during the start and stop motion.

To prevent the spinning rotor from getting damaged by accidental contact with the stator during the start or stop motion, the outer surfaces of the spinning rotor and/or the inner surfaces of that stator part which contains the pole extensions are coated with a protective coating consisting for instance of rubber or of a plastic material.

DESCRIPTION OF THE DRAWINGS

An example of embodiment of the spinning unit of a rotor spinning machine according to the invention is schematically shown in the accompanying drawing in which.

MODES FOR CARRYING OUT THE INVENTION

Figure 1:
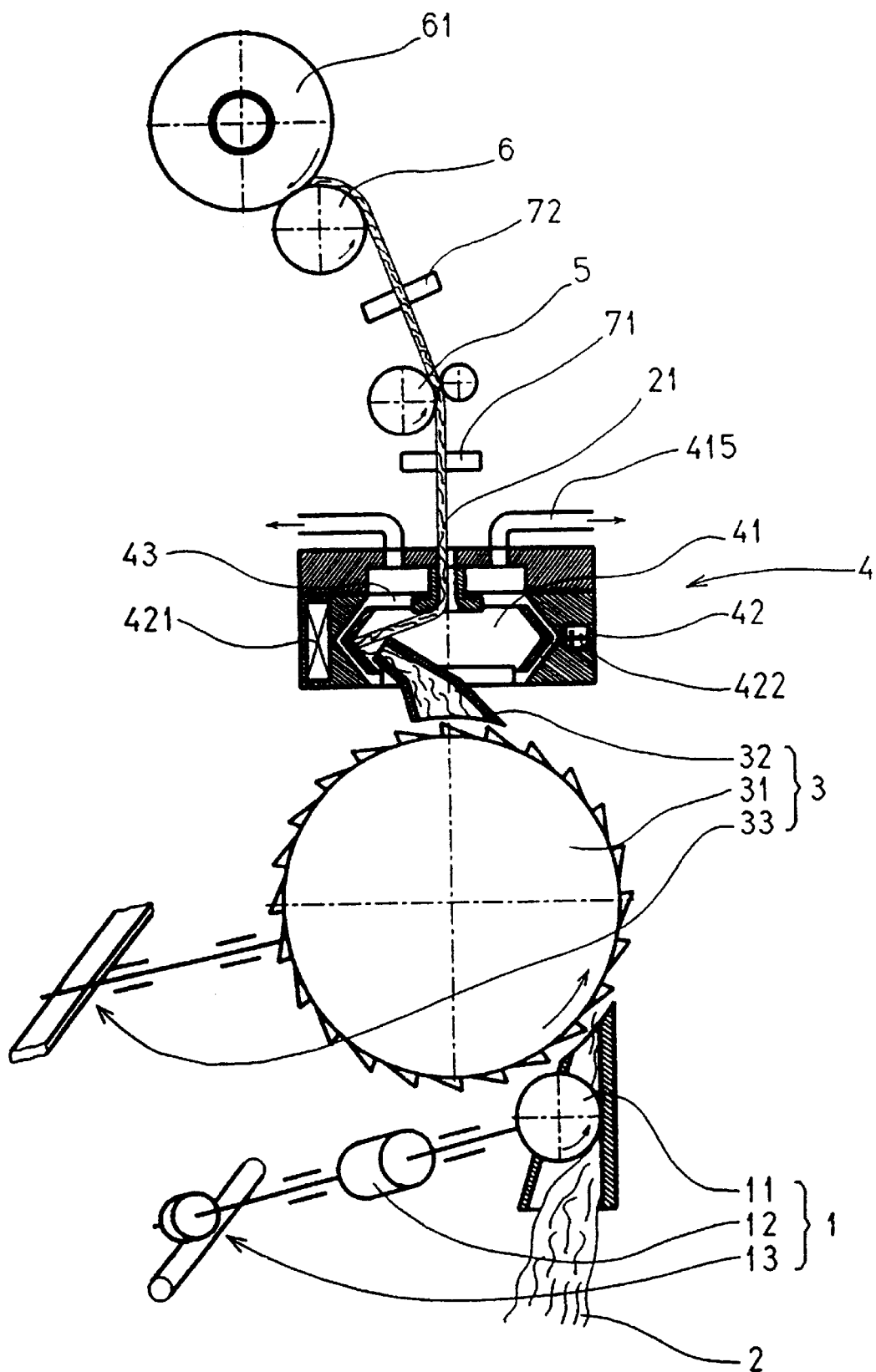
FIG. 1 is a vertical sectional view of the spinning device and of a part of the operating unit of the machine.

The rotor spinning machine comprises a plurality of operating units situated side by side. Each of them operates independently in the yarn production and when in operation has related thereto a sliver container. Each spinning unit comprises a sliver feed device 1 into whose inlet section there is introduced a sliver, 2 from a well-known, not represented container. The sliver feed device 1 contains a well-known rotatably mounted feed roller 11 which is in a well-known manner, by means of a feed clutch 12, connected with a feed drive 13 made either as a central drive of the spinning machine as is the case in the example of embodiment shown in FIG. 1, or as an individual drive. The outlet part of the sliver feed device 1 is in a well-known manner followed by a singling-out device 3 comprising a rotatably mounted combing roller 31 made in one of the well-known embodiments and coupled with a drive 33 of the singling-out device 3, made either as the central drive of the spinning machine or as an individual drive. Around the circumference of the combing roller 31, a well-known operating area for feeding the singled-out fibres is provided in the body of the singling out device followed by a transport channel 32 for singled-out fibres leading into a spinning rotor 41 of a spinning device 4.

The spinning rotor 41 consists of a ring made of a magnetically hard material magnetized normal to the plane passing through the axis of its rotation, and constituting the rotor of a synchronous electric machine whose stator 42 surrounds the circumference of the spinning rotor 41.

The yam 21 is in a well-known manner produced in the spinning rotor 41 and drawn-off out of it by a well-known draw-off device 5 and then in a well-known winding device 6 wound on a bobbin 61. As a rule, at least one yarn monitoring device 7 for sensing the quality and/or presence of the yarn 21 is situated between the spinning device 4 and the winding device 6. In the shown example of embodiment, a yarn quality and presence sensor 71 is situated between the spinning device 4 and the draw-off device 5, and a yam presence sensor 72 is situated between the draw-off device 5 and the winding device 6.

The stator 42 is a part of an air chamber 43 in whose inner space the spinning rotor 41 is seated. Due to its ring-like shape, the spinning rotor 41 consists only of a circumferential wall having at its inner side a slide wall 411 defining at its narrowest section an inlet aperture 412 of the rotor and gradually widening up to a collecting groove 413. Situated opposite the inlet aperture 412 of the spinning rotor 41 is its outlet aperture 414 having situated therein a draw-off trumpet 44 made in one of the well-known embodiments. The diameter of the outlet aperture 414 of the spinning rotor 41 is superior to the maximum outer diameter of the draw-off trumpet 44 thus permitting the technological air to stream through the spinning rotor 41 from its inlet aperture 412 to its outlet aperture 414. Into the inlet aperture 412 of the spinning rotor 41 leads also the transport channel 32 of the singled-out fibres.

In the shown embodiment, the stator 42 of the synchronous electric machine surrounds the outer circumference of the spinning rotor 41 and the shape of the inner surface of the stator 41 is the same as, or similar to, the shape of the outer surface of the spinning rotor 41. In operating conditions, a gap is provided between the stator 42 and the spinning rotor 41 to prevent them from getting into mutual contact. The term "operating conditions" is meant to describe the state in which the spinning rotor 41 is exposed to the action of both components of the magnetic field of the electromagnetic coils 421 of the stator 42 i.e., on one side, of the magnetic field with the axial force component lifting the spinning rotor 41 to its operative position and maintaining it in it, and, on the other side, of the magnetic field with the rotary force component imparting to the spinning rotor 41 rotation in a predetermined direction. The stator 42 comprises at least two electromagnetic coils 421 evenly distributed around the circumference of the spinning rotor 41 and in a well-known manner connected to power outputs 811 of a frequency converter 81 of an integrated control system 8 of the spinning device 4.

In another preferred embodiment of the invention, the electromagnetic coils of the stator can be arranged under the spinning rotor and coupled with pole extensions whose ends surround the outer circumference of the spinning rotor and create the inner surface of the stator analogically to the embodiment described above. The electromagnetic coils also can be arranged over the spinning rotor. The diameter of the circle around which the electromagnetic coils are arranged is independent of the diameter of the spinning rotor.

The integrated control system 8 is made independently for each spinning device 4 and comprises a frequency converter 81 whose power supply inputs 812 are connected to a power supply source 82 made either as a central power supply source or as an individual power supply source of the operating unit in question interconnected with the central power supply of the spinning machine. To a control input 813 of the frequency converter 81 is connected a control output 831 of a control circuit 83 to whose information inputs 832 there are connected in the shown example of embodiment at least three sensors 422 of the magnetic field evenly distributed around the outer circumference of the spinning rotor 41, seated in the body of the stator 42, and used for monitoring the position of the spinning rotor 41 inside the stator 42, especially in the operating conditions of the spinning rotor 41. In the shown example of embodiment, the yarn quality and presence sensor 71 and the yarn presence sensor 72 are connected to other information inputs 832 of the control circuit 83. At the same time, the control circuit is fitted with well-known, not represented means for interrupting the power supply to the feed clutch 12 of the feed roller 11 used to supply the sliver 2 to the singling-out device 3. Via its another control output 831 it is connected with the feed clutch 12. If the power supply source 82 supplies direct current, the frequency converter 81 is made as a well-known converter.

In another, not represented embodiment of the invention, the sensors 422 of the magnetic field are not used, and the position of the spinning rotor 41 in the stator 42 is monitored only as the position taken up by the spinning rotor 41 after carrying out a particular command received from the control circuit 83. The spinning rotor 41 is stabilized by the auto-stabilizing function of the magnetic field which is a routine task within the reach of the actual pertinent state of art.

The air chamber 43 surrounds as an airtight enclosure the spinning rotor 41, and its inner space is behind the outlet aperture 414 of the spinning rotor connected through an underpressure line 415 with an underpressure source, for instance with a not represented underpressure source of the spinning machine. Due to this arrangement, the technological air enters together with the singled-out fibres the spinning rotor 41 through its inlet aperture 412 and leaves the spinning rotor 41 through its outlet aperture 414 passing through the ring-shaped aperture between the circumference of the outlet aperture 414 and the outer circumference of the draw-off trumpet 44 whereupon it is led from the air chamber 43 in the direction of the underpressure source.

Figure 2:
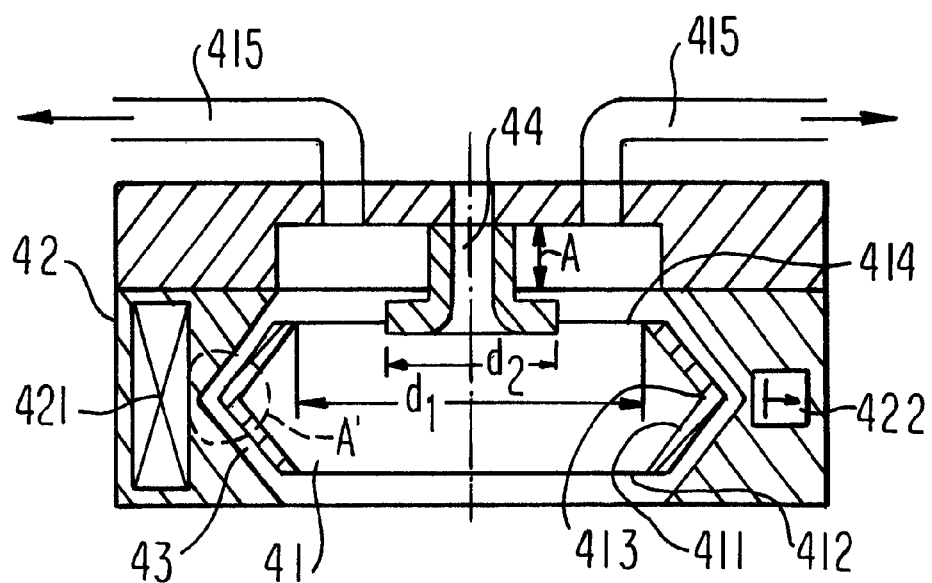
FIG. 2 is a detail of the vertical sectional view of the spinning rotor of FIG. 1.

The draw-off trumpet 44 can be mounted such that it is displaceable relative to the spinning rotor 41 in an axial direction as shown by arrow A in FIG. 2. Any conventional or suitable actuating mechanism can be easily utilized to displace the draw-off trumpet in an optimum position in relation to the collection groove 413 according to the material and to the required properties of the yarn to be produced as will be apparent to those skilled in the art, in light of the disclosure herein.

The gap created in the operative condition between the spinning rotor 41 and the stator 42 that is a component of the air chamber 43 permits a small amount of the technological air to stream along the outer circumference of the spinning rotor 41 and thus to cool both the spinning rotor 41 and the stator 42 of the synchronous electric machine. Besides, this air stream removes dust particles and fibres from the area around the outer circumference of the spinning rotor 41.

Figure 2A:
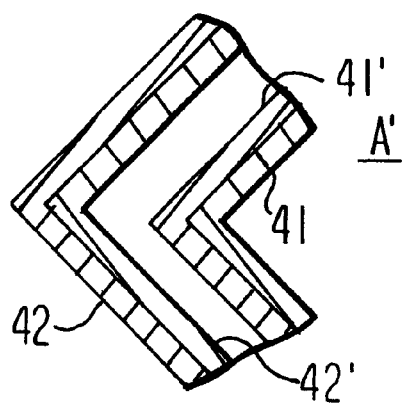
FIG. 2A is an enlarged detail A' of FIG. 2
Figure 3:
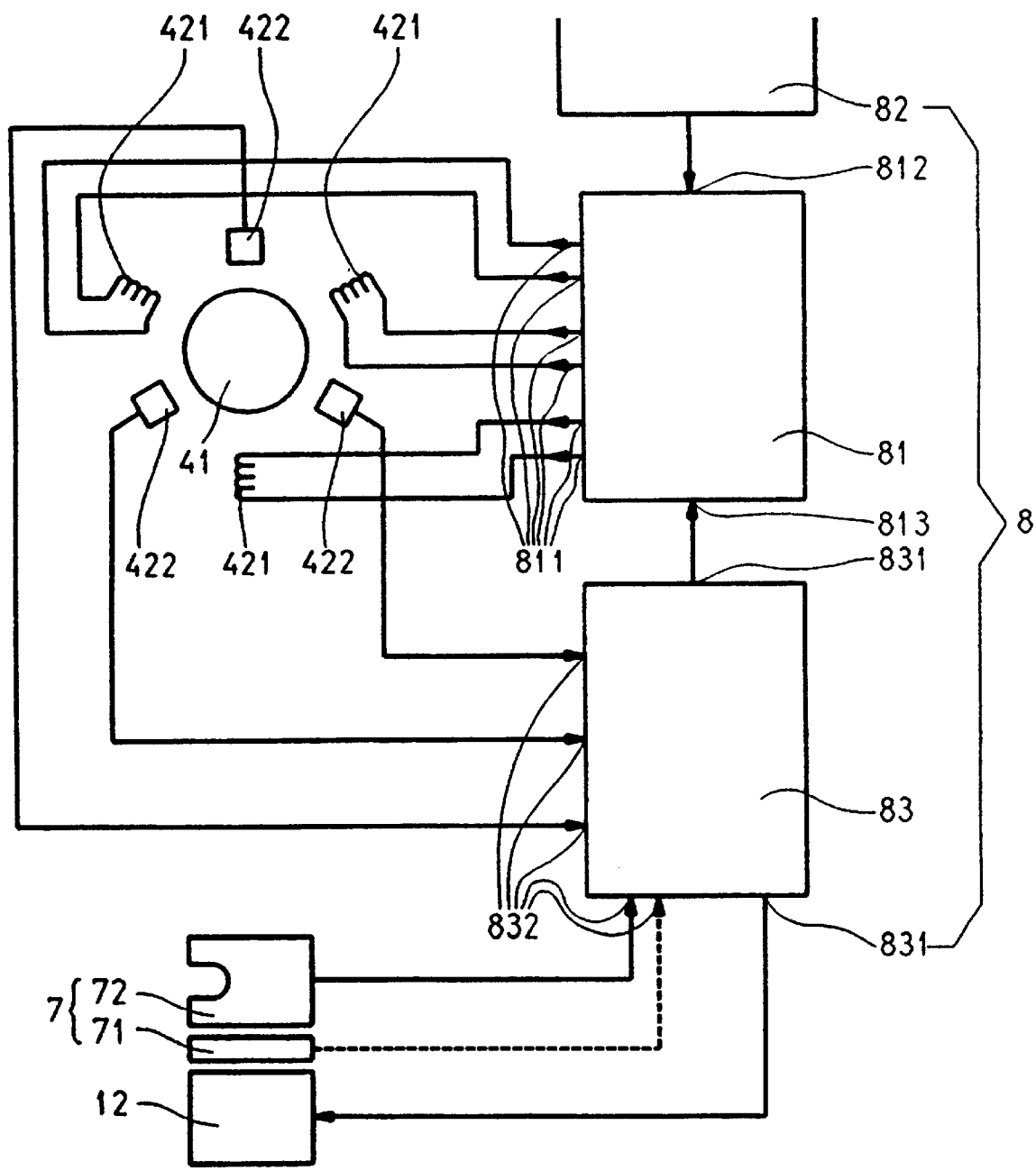
FIG. 3 is an integrated control system, of the spinning device.

In order to reduce to a minimum the risk of damages to the spinning rotor 41 and to the stator 42 in the shown alternative embodiments of the invention, the outer surface of the outer circumference of the spinning rotor 41 and/or the inner surface of the stator 42, in particular in its section surrounding the spinning rotor 41 is/are coated with a protective coating 41' and 42', respectively, made for instance of rubber or of a plastic material, as shown in FIG. 2A.

In the shown example of embodiment, the axis of rotation of the spinning rotor 41 is vertical, the axis of rotation of the combing roller 31 is horizontal and normal to the longitudinal axis plane of the spinning machine.

The feed roller 11 of the sliver feed device 1 is situated at the lower edge of the combing roller 31 of the singling-out device 3 so that the sliver 2 is led from the sliver container between the feed roller 11 and the combing roller 31 directly without the need of bending or twisting it.

Depending on possible specific requirements imposed upon the design of the operating unit of the rotor spinning machine, the above specified position of the rotation axes of the spinning rotor 41 combing roller 31, and feed roller 11 can be modified at will on the condition that the mutual design and technological interconnections between these components remain maintained.

In the stopped condition of the spinning device 4 of the operating unit in question of the rotor spinning machine, the spinning rotor 41; acted upon by the force of gravity, freely rests on the corresponding surface of the stator 42. In the shown example of embodiment, the spinning rotor 41 rests on the lower side surface of the stator 42.

During the start of the spinning rotor 41, the control circuit 83 gives command to the frequency converter 81, and the electromagnetic coils 421 of the stator 42 receive power from the power source 82. Then, in response to the commands of the control circuit 83, the frequency converter 81 converts the frequency of the electric current led into the electromagnetic coils 421 of the stator 42. In the stator 42 there is first generated a magnetic field with an axial force component which will lift the spinning rotor 41 into its operative position and maintain it therein. Then is generated a rotary magnetic field with a rotary force component setting the spinning rotor 41 into rotary motion in a predetermined direction and either maintaining its speed of rotation on a predetermined value or modifying it in response to the commands of the control circuit 83.

The momentary position of the spinning rotor 41 is monitored by the sensors 422 of the magnetic field whose signal is led via the information inputs 832 into the control circuit 83 which uses the information thus acquired to influence the course of the electromagnetic field in order to stabilize the position of the spinning rotor 41 against disturbing influences occurring during the operation such as imperfect balancing, the spinning-in time interval. etc.

As soon as all mechanisms of the operation unit of the rotor spinning machine are ready for spinning-in, the control circuit 83 engages the feed clutch 12 whereupon the feed roller begins to feed the sliver 2 into the singling-out device 3 which begins to feed the singled-out fibres into the spinning rotor 41 in which the fibres move in a well-known manner on the slide wall 411, collect in the collecting groove 413 into a fibre band to be spun-in and get twisted into yarn 21, drawn-off and wound on the bobbin 61.

The operative underpressure in the inner space of the spinning rotor 41 is generated by an external underpressure source, and the stream of the technological air passes through the inner space of the spinning rotor 41 from its inlet aperture 412 to its outlet aperture 414 behind which the underpressure chamber 43 is connected by means of the underpressure line 415 with the underpressure source thus maintaining the advantage of a perfect fibre feed with the favourable influence on the textile technology known in the spinning rotors fitted with air vents but at the same time eliminating the drawback of such spinning rotors fitted with air vents consisting in the dependence of the underpressure on the speed of rotation of the spinning rotor.

The control circuit 83 controls the position and speed of rotation of the spinning rotor 41 during the spinning on the basis of the signals arriving, on one side, from the sensors 422 of the magnetic field and, on the other side, from the yam quality and presence sensor 71 on the basis of the preset parameters of the yarn and/or of the spinning machine. If the control circuit 83 receives from the yarn quality and presence sensor 71 or from the yarn presence sensor 72 a signal reporting the absence; i.e., the rupture, of the yarn 21, it disengages the feed clutch 12 and gives commands to the frequency converter 81 to stop the spinning rotor 41. By converting the magnetic field of the stator 42, the frequency converter 81 first stops the spinning rotor 41 and then lets it drop to it's rest position.

The signal coming from the sensors 422 of the magnetic field stands in correlation with a possible uneven pollution of the spinning rotor 41 in particular of its collecting groove 413. Such uneven pollution can impair the quality of the yarn 21 produced under such conditions; consequently, this signal also can be used for controlling the system of the preventive cleaning of the spinning rotors 41.

After a repeated start of the spinning rotor 41 after the cleaning, the signal coming from the sensors 422 of the magnetic field also can be used for checking whether the preceding cleaning operation has been successful and whether no unevenly distributed impurities have remained in the collecting groove 413 of the spinning rotor 41. If such impurities have been detected the start of the spinning rotor 41 can be stopped prior to the spinning-in, and the cleaning operation can be repeated or the operating unit in question can be set out of operation and an attending operator called-in.

The integrated control system 8 of the spinning device 4 and the corresponding electronic equipment of the rotor spinning machine contains means of recuperation of the electric energy during the braking of the spinning rotor 41 thus reducing both the energy consumption and the demands put on the cooling during the removal of the loss energy during the braking of the spinning rotor 41. If the power supply drops out, the spinning rotors are braked electrically and together with the recuperation means are used to supply power to control circuits to span the drop-out for a number of seconds.

What is claimed is:

1. A spinning device for producing yarns from a plurality of individual fibers which advance along a path in a rotor spinning machine, comprising:

an air chamber centered along an axis and located along the path;

a stator having a body mounted in the air chamber and provided with an inward radial surface;

a ring-shaped rotor made of magnetizable material and mounted in the air chamber inside the stator, the ring-shaped rotor having a peripheral radial wall provided with an outer surface, which is opposed to the inward radial surface of the stator, and with an inner surface having a collecting groove, the inner surface defining an outlet aperture spaced downstream from the collecting groove and an inlet aperture spaced upstream from the collecting groove;

a plurality of coils wound in the body of the stator and energizable to produce a magnetic field acting on the ring-shaped rotor; and a controller for controllably energizing the coils so that the stator produces a first magnetic force: displacing the ring-shaped rotor axially relative to the stator to an operative position, in which the outer surface of the ring-shaped rotor is spaced radially from the inward radial surface of the stator, and a second magnetic force acting on the ring-shaped rotor such that the rotor rotates about the axis in the operative position to guide individual fibers entering: the inlet opening toward the outlet opening via the collecting groove for producing the yarns.

2. The spinning device defined in claim 1, wherein each of the inlet and outlet apertures of the ring-shaped rotor has a respective diameter smaller than a diameter of a portion of the inner surface which is provided with the collecting groove.

3. The spinning device defined in claim 1, further comprising a draw-off trumpet located downstream from the collecting groove for drawing off the yarns twisted from the individual fibers which are collected in the collecting groove during rotation of the ring-shaped rotor.

4. The spinning device defined in claim 3, wherein the draw-off trumpet extends from the ring-shaped rotor into the air chamber through the outlet aperture.

5. The spinning device defined in claim 3, wherein the draw-off trumpet is mounted in the air chamber so that it is spaced axially from and located downstream from the outlet aperture.

6. The spinning device defined in claim 3 wherein the draw-off trumpet is mounted in the air chamber so that it is axially adjustable relative to the collecting groove, the outlet aperture being dimensioned to be larger than an outer dimension of the draw-off trumpet.

7. The spinning device defined in claim 1, further comprising an underpressure source located downstream from the air chamber and in flow communication therewith for evacuating air entering the ring-shaped rotor via the inlet aperture simultaneously with the individual fibers.

8. The spinning device defined in claim 1, wherein at least one of the inner radial surface of the stator and the outer surface of the rotor is covered with a coating layer.

9. A spinning device for producing yarns from a plurality of individual fibers, comprising:

a stator extending along an axis and having an inward radial surface;

a plurality of coils wound in the stator;

a rotor mounted inside the stator and having a peripheral radial wall provided with an outer surface, which is opposed to the inward radial surface of the- stator, and with an inner surface having a collecting groove, the inner surface defining inlet and outlet apertures spaced axially from the collecting groove in opposite directions; and a controller for sequentially energizing the coils so that when one coil is energized, the stator produces a first magnetic force displacing the stator and rotor axially relative to one another to an operative position, in which the outer surface of the rotor and the inward radial surface of the stator are spaced radially from one another, and when the other coil is energized, the stator produces a second magnetic force acting on the rotor such that it rotates relative to the stator to guide individual fibers entering the inlet opening toward the outlet opening via the collecting groove for producing the yarns.

* * * * *